(12) United States Patent
Lin

(10) Patent No.: US 10,088,875 B1
(45) Date of Patent: Oct. 2, 2018

(54) 360° PIVOTAL DEVICE FOR AN ELECTRONIC PRODUCT

(71) Applicant: Leohab Enterprise Co., Ltd., Taichung (TW)

(72) Inventor: Chao-Chi Lin, Taichung (TW)

(73) Assignee: Leohab Enterprises Co., Ltd., Taichung (TW)

( * ) Notice: Subject to any disclaimer, the term of this patent is extended or adjusted under 35 U.S.C. 154(b) by 0 days.

(21) Appl. No.: 15/644,913

(22) Filed: Jul. 10, 2017

(51) Int. Cl.
*G06F 1/16* (2006.01)
*E05D 7/00* (2006.01)
*E05D 3/14* (2006.01)
*E05D 11/10* (2006.01)

(52) U.S. Cl.
CPC ............ *G06F 1/1681* (2013.01); *E05D 3/14* (2013.01); *E05D 7/00* (2013.01); *G06F 1/1618* (2013.01); *E05D 11/105* (2013.01); *E05Y 2900/606* (2013.01)

(58) Field of Classification Search
None
See application file for complete search history.

(56) References Cited

U.S. PATENT DOCUMENTS

| | | | | |
|---|---|---|---|---|
| 8,776,319 B1* | 7/2014 | Chang | ................... | G06F 1/1681 16/303 |
| 9,134,767 B2* | 9/2015 | Chen | ................ | G06F 1/1681 |
| 9,439,311 B2* | 9/2016 | Hsu | ....................... | E05D 3/122 |
| 9,598,886 B2* | 3/2017 | Kasai | ....................... | E05D 3/12 |
| 9,857,849 B1* | 1/2018 | Siddiqui | .............. | G06F 1/1681 |
| 2005/0155182 A1* | 7/2005 | Han | ...................... | H04M 1/022 16/336 |
| 2009/0013500 A1* | 1/2009 | Ueyama | ............... | G06F 1/1616 16/354 |
| 2009/0070961 A1* | 3/2009 | Chung | .................... | E05D 3/122 16/354 |
| 2010/0024169 A1* | 2/2010 | Self | ......................... | A47K 3/36 16/354 |
| 2011/0000136 A1* | 1/2011 | Brun | ....................... | E05D 3/06 49/358 |
| 2012/0047685 A1* | 3/2012 | Ma | ...................... | G06F 1/1681 16/319 |

(Continued)

FOREIGN PATENT DOCUMENTS

TW    M531995 U    11/2016

*Primary Examiner* — Xanthia C Cunningham
(74) *Attorney, Agent, or Firm* — Alan D. Kamrath; Kamrath IP Lawfirm, P.A.

(57) ABSTRACT

A 360° pivotal device for an electronic product includes a first pivotal shaft extending along a first axis, a second pivotal shaft extending along a second axis, and a connecting device. The connecting device includes a first supporting seat, a first intermediate shaft, and a second intermediate shaft. The first pivotal shaft, the second pivotal shaft, the first intermediate shaft, and the second intermediate shaft are coupled to the first supporting seat. The connecting device includes a reference plane on which the first axis and the second axis are located. The first intermediate shaft and the second intermediate shaft are located on the same side of the reference plane. Due to arrangement of the pivotal device, the spacing between the first pivotal shaft and the second pivotal shaft can be greatly reduced to reduce the thickness of the electronic product.

4 Claims, 5 Drawing Sheets

(56) References Cited

U.S. PATENT DOCUMENTS

| | | | | |
|---|---|---|---|---|
| 2012/0137471 A1* | 6/2012 | Kujala | G06F 1/1681 | |
| | | | 16/382 | |
| 2013/0016489 A1* | 1/2013 | Yeh | G06F 1/1681 | |
| | | | 361/807 | |
| 2013/0016492 A1* | 1/2013 | Wang | E05D 3/18 | |
| | | | 361/820 | |
| 2013/0187525 A1* | 7/2013 | Chuang | G06F 1/1681 | |
| | | | 312/326 | |
| 2013/0322004 A1* | 12/2013 | Park | F16C 11/10 | |
| | | | 361/679.27 | |
| 2014/0360296 A1* | 12/2014 | Hsu | G06F 1/1616 | |
| | | | 74/98 | |
| 2015/0361696 A1* | 12/2015 | Tazbaz | H04M 1/022 | |
| | | | 361/679.27 | |
| 2016/0070310 A1* | 3/2016 | Holung | G06F 1/1681 | |
| | | | 361/679.09 | |
| 2016/0187934 A1* | 6/2016 | Lee | G06F 1/1618 | |
| | | | 361/679.56 | |
| 2018/0024596 A1* | 1/2018 | Park | G06F 1/1681 | |

* cited by examiner

360° PIVOTAL DEVICE FOR AN ELECTRONIC PRODUCT

BACKGROUND OF THE INVENTION

The present invention relates to a pivotal device and, more particularly, to a 360° pivotal device for an electronic product.

Taiwan Utility Model M531995 discloses a fixing structure for a dual-shaft device for the purposes of providing a simple structure with a reduced assembling tolerance between components, such that the resultant electronic product can be more compact. The fixing structure includes an actuator mounted on a first shaft and a follower mounted on a second shaft. An interlocking member is interconnected between the actuator and the follower, such that the first shaft and the second shaft rotate synchronously. A main fixing board and an auxiliary fixing board are assembled with the first shaft and the second shaft and are located on two sides of the actuator and the follower, preventing deviation of the actuator, the follower, and the interlocking member in a horizontal reference direction. Each of the main board and the auxiliary board includes an opening portion for limiting at least two sides of the interlocking member, thereby preventing deviation of the interlocking member in another horizontal reference direction. Thus, the transmission accuracy is increased, and the assembling complexity is reduced.

A gear device is used to enable synchronous rotation of the first and second shafts. If the above dual-shaft device with the above arrangement is used, a certain spacing between the first and second shafts must be maintained for receiving gears. The first shaft and the second shaft are coupled to two components, generally a screen and a keyboard, of an electronic product. Use of the above dual-shaft device results in an increase in the overall thickness of the electronic product. Thus, the electronic product looks thick and heavy.

Thus, a need exists for a novel pivotal device for an electronic product to mitigate and/or obviate the above disadvantages.

BRIEF SUMMARY OF THE INVENTION

In an aspect, a 360° pivotal device for an electronic product according to the present invention includes a first pivotal shaft extending along a first axis. A second pivotal shaft extends along a second pivotal axis. A connecting device includes a first supporting seat, a first intermediate shaft, and a second intermediate shaft. The first intermediate shaft extends along a third axis. The second intermediate shaft extends along a fourth axis. The first pivotal shaft, the second pivotal shaft, the first intermediate shaft, and the second intermediate shaft are coupled to the first supporting seat. The first axis, the second axis, the third axis, and the fourth axis are parallel to each other. The connecting device includes a reference plane on which the first axis and the second axis are located. The third axis and the fourth axis are on the same side of the reference plane. The connecting device includes a first gear, a second gear, a third gear, and a fourth gear. The first gear is coupled to the first pivotal shaft. The first gear and the first pivotal shaft are jointly pivotable relative to the first supporting seat. The second gear is coupled to the second pivotal shaft. The second gear and the second pivotal shaft are jointly pivotable relative to the first supporting seat. The third gear is coupled to the first intermediate shaft. The third gear and the first intermediate shaft are jointly pivotable relative to the first supporting seat. The fourth gear is coupled to the second intermediate shaft. The fourth gear and the second intermediate shaft are jointly pivotable relative to the first supporting seat. The third gear meshes with the first gear. The fourth gear meshes with the second gear. The third gear meshes with the fourth gear.

In an example, a minimal spacing between the third axis and the fourth axis is smaller than a minimal spacing between the first axis and the second axis. The minimal spacing between the first axis and the second axis is smaller than 1.7 times the minimal spacing between the third axis and the fourth axis.

In an example, the first pivotal shaft includes a first section, a second section, a third section, a fourth section, and a fifth section. The first section of the first pivotal shaft includes a connecting portion, a coupling portion opposite to the connecting portion, and a pivotal portion between the connecting portion and the coupling portion. The third section of the first pivotal shaft includes a first coupling portion, a second coupling portion opposite to the first coupling portion, and a pivotal portion between the first coupling portion and the second coupling portion. The fifth section of the first pivotal shaft includes a connecting portion, a coupling portion opposite to the connecting portion, and a pivotal portion between the connecting portion and the coupling portion.

In an example, the second pivotal shaft includes a first section, a second section, a third section, a fourth section, and a fifth section. The first section of the second pivotal shaft includes a connecting portion, a coupling portion opposite to the connecting portion, and a pivotal portion between the connecting portion and the coupling portion. The third section of the second pivotal shaft includes a first coupling portion, a second coupling portion opposite to the first coupling portion, and a pivotal portion between the first coupling portion and the second coupling portion. The fifth section of the second pivotal shaft includes a connecting portion, a coupling portion opposite to the connecting portion, and a pivotal portion between the connecting portion and the coupling portion.

In an example, the first intermediate shaft includes a first section, a second section, a third section, a fourth section, and a fifth section. The third section of the first intermediate shaft includes a first coupling portion, a second coupling portion opposite to the first coupling portion, and a pivotal portion between the first coupling portion and the second coupling portion.

In an example, the second intermediate shaft includes a first section, a second section, a third section, a fourth section, and a fifth section. The third section of the second intermediate shaft includes a first coupling portion, a second coupling portion opposite to the first coupling portion, and a pivotal portion between the first coupling portion and the second coupling portion.

In an example, the connecting device includes a second supporting seat and a third supporting seat. The first supporting seat is mounted around the pivotal portion of the first section of the first pivotal shaft, the pivotal portion of the first section of the second pivotal shaft, the first section of the first intermediate shaft, and the first section of the second intermediate shaft.

In an example, the second supporting seat is mounted around the pivotal portion of the third section of the first pivotal shaft, the pivotal portion of the third section of the second pivotal shaft, the pivotal portion of the third section of the first intermediate shaft, and the pivotal portion of the third section of the second intermediate shaft.

In an example, the third supporting seat is mounted around the pivotal portion of the fifth section of the first pivotal shaft, the pivotal portion of the fifth section of the second pivotal shaft, the fifth section of the first intermediate shaft, and the fifth section of the second intermediate shaft.

In an example, the first gear includes a first section, a second section, a third section, and a fourth section. The second gear includes a first section, a second section, a third section, and a fourth section. The third gear includes a first section, a second section, a third section, and a fourth section. The fourth gear includes a first section, a second section, a third section, and a fourth section.

In an example, an end of the first section of the first gear is mounted around the coupling portion of the first section of the first pivotal shaft. The other end of the first section of the first gear is mounted around the second section of the first pivotal shaft. An end of the second section of the first gear is mounted around the second section of the first pivotal shaft. The other end of the second section of the first gear is mounted around the first coupling portion of the third section of the first pivotal shaft. An end of the third section of the first gear is mounted around the second coupling portion of the third section of the first pivotal shaft. The other end of the third section of the first gear is mounted around the fourth section of the first pivotal shaft. An end of the fourth section of the first gear is mounted around the fourth section of the first pivotal shaft. The other end of the fourth section of the first gear is mounted around the coupling portion of the fifth section of the first pivotal shaft.

In an example, an end of the first section of the second gear is mounted around the coupling portion of the first section of the second pivotal shaft. The other end of the first section of the second gear is mounted around the second section of the second pivotal shaft. An end of the second section of the second gear is mounted around the second section of the second pivotal shaft. The other end of the second section of the second gear is mounted around the first coupling portion of the third section of the second pivotal shaft. An end of the third section of the second gear is mounted around the second coupling portion of the third section of the second pivotal shaft. The other end of the third section of the second gear is mounted around the fourth section of the second pivotal shaft. An end of the fourth section of the second gear is mounted around the fourth section of the second pivotal shaft. The other end of the fourth section of the second gear is mounted around the coupling portion of the fifth section of the second pivotal shaft.

In an example, an end of the first section of the third gear is mounted around the first section of the first intermediate shaft. The other end of the first section of the third gear is mounted around the second section of the first intermediate shaft. An end of the second section of the third gear is mounted around the second section of the first intermediate shaft. The other end of the second section of the third gear is mounted around the first coupling portion of the third section of the first intermediate shaft. An end of the third section of the third gear is mounted around the second coupling portion of the third section of the first intermediate shaft. The other end of the third section of the third gear is mounted around the fourth section of the first intermediate shaft. An end of the fourth section of the third gear is mounted around the fourth section of the first intermediate shaft. The other end of the fourth section of the third gear is mounted around the fifth section of the first intermediate shaft.

In an example, an end of the first section of the fourth gear is mounted around the first section of the second intermediate shaft. The other end of the first section of the fourth gear is mounted around the second section of the second intermediate shaft. An end of the second section of the fourth gear is mounted around the second section of the second intermediate shaft. The other end of the second section of the fourth gear is mounted around the first coupling portion of the third section of the second intermediate shaft. An end of the third section of the fourth gear is mounted around the second coupling portion of the third section of the second intermediate shaft. The other end of the third section of the fourth gear is mounted around the fourth section of the second intermediate shaft. An end of the fourth section of the fourth gear is mounted around the fourth section of the second intermediate shaft. The other end of the fourth section of the fourth gear is mounted around the fifth section of the second intermediate shaft.

In another aspect, an electronic product includes the 360° pivotal device. The electronic product includes a first component including a side having a first lug and a second lug. The electronic product further includes a second component including a side having a third lug and a fourth lug. The connecting portion of the first section of the first pivotal shaft is connected to the first lug. The connecting portion of the fifth section of the first pivotal shaft is connected to the second lug. The connecting portion of the first section of the second pivotal shaft is connected to the third lug. The connecting portion of the fifth section of the second pivotal shaft is connected to the fourth lug. The first gear, the second gear, the third gear, and the fourth gear form a part of a contour of the electronic product. In an ideal condition, the thickness of the electronic product can be smaller than 10 mm.

The present invention will become clearer in light of the following detailed description of illustrative embodiments of this invention described in connection with the drawings.

DETAILED DESCRIPTION OF THE INVENTION

Figure 1:
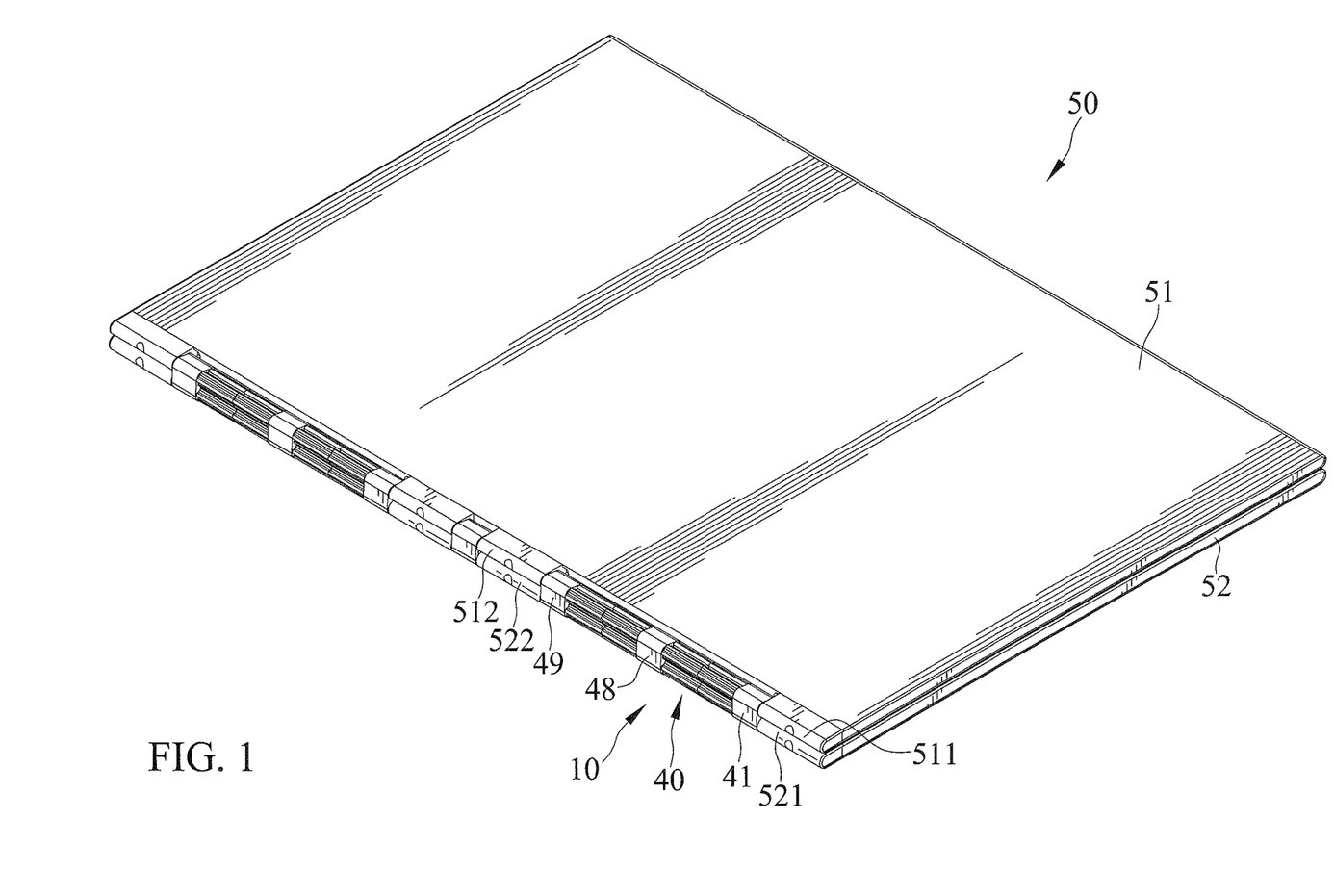
FIG. 1 is a perspective view of an electronic product with a 360° pivotal device according to the present invention.
Figure 2:
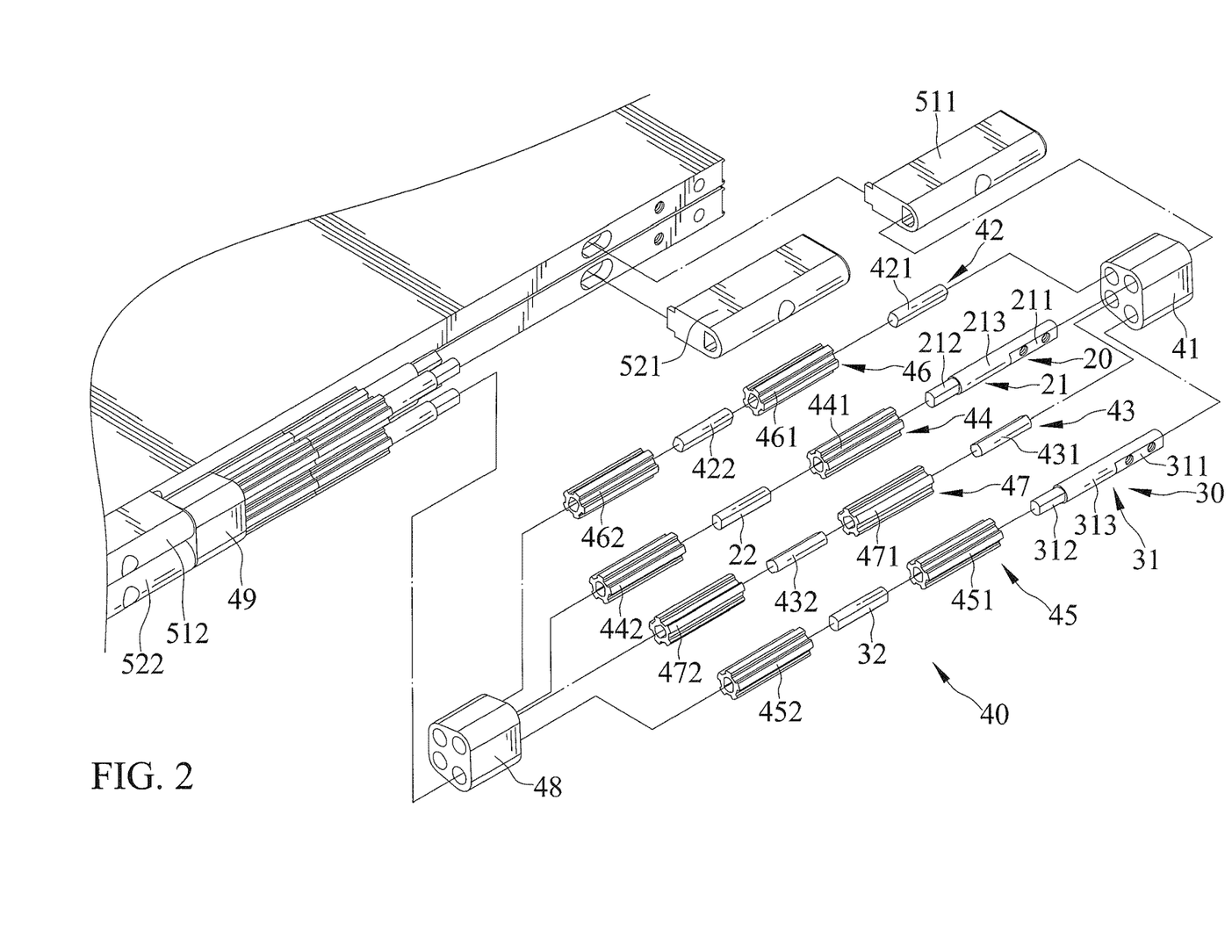
FIG. 2 is a partial, exploded perspective view of a portion of the 360° pivotal device of FIG. 1.
Figure 3:
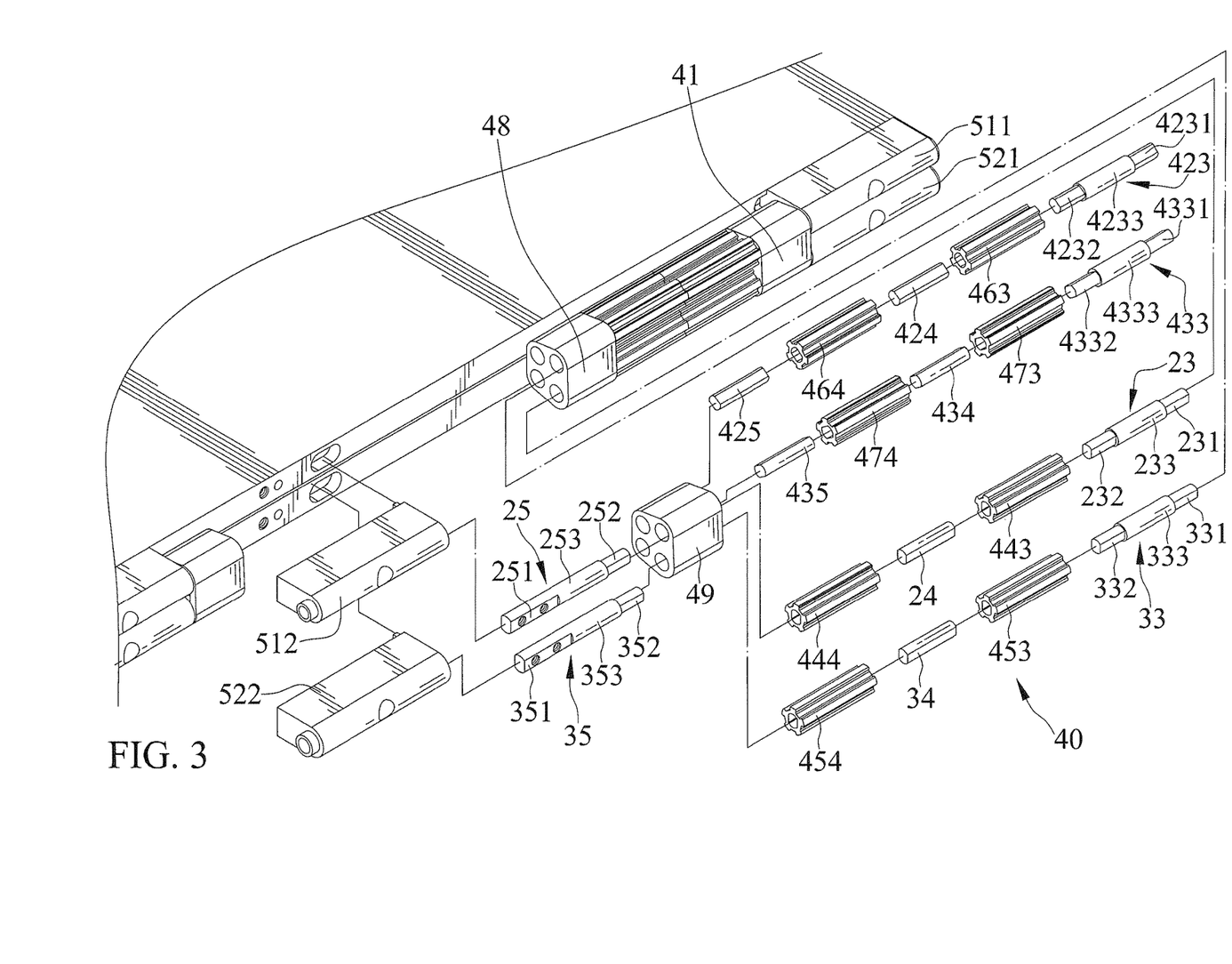
FIG. 3 is a partial, exploded perspective view of another portion of the 360° pivotal device of FIG. 1.

FIGS. 1-3 shows an electronic product 50 including a 360° pivotal device 10 according to the present invention. The 360° pivotal device 10 includes a first pivotal shaft 20, a second pivotal shaft 30, and a connecting device 40. The electronic product 50 includes a first component 51 and a second component 52 as well as the pivotal device 10.

With reference to FIGS. 1-5, the first pivotal shaft 20 extends along a first axis L1 and includes a first section 21, a second section 22, a third section 23, a fourth section 24, and a fifth section 25. The first section 21 of the first pivotal shaft 20 includes a connecting portion 211, a coupling portion 212 opposite to the connecting portion 211, and a pivotal portion 213 between the connecting portion 211 and the coupling portion 212. The third section 23 of the first pivotal shaft 20 includes a first coupling portion 231, a second coupling portion 232 opposite to the first coupling portion 231, and a pivotal portion 233 between the first coupling portion 231 and the second coupling portion 232. The fifth section 25 of the first pivotal shaft 20 includes a connecting portion 251, a coupling portion 252 opposite to the connecting portion 251, and a pivotal portion 253 between the connecting portion 251 and the coupling portion 252.

The second pivotal shaft 30 extends along a second pivotal axis L2 and includes a first section 31, a second section 32, a third section 33, a fourth section 34, and a fifth section 35. The first section 31 of the second pivotal shaft 30 includes a connecting portion 311, a coupling portion 312 opposite to the connecting portion 311, and a pivotal portion 313 between the connecting portion 311 and the coupling portion 312. The third section 33 of the second pivotal shaft 30 includes a first coupling portion 331, a second coupling portion 332 opposite to the first coupling portion 331, and a pivotal portion 333 between the first coupling portion 331 and the second coupling portion 332. The fifth section 35 of the second pivotal shaft 30 includes a connecting portion 351, a coupling portion 352 opposite to the connecting portion 351, and a pivotal portion 353 between the connecting portion 351 and the coupling portion 352.

The connecting device 40 includes a first supporting seat 41, a first intermediate shaft 42, and a second intermediate shaft 43. The first intermediate shaft 42 extends along a third axis L3. The second intermediate shaft 43 extends along a fourth axis L4. The first pivotal shaft 20, the second pivotal shaft 30, the first intermediate shaft 42, and the second intermediate shaft 43 are coupled to the first supporting seat 41. The first axis L1, the second pivotal axis L2, the third axis L3, and the fourth axis L4 are parallel to each other. The connecting device 40 includes a reference plane P on which the first axis L1 and the second axis L2 are located. The third axis L3 and the fourth axis L4 are on the same side of the reference plane P. A minimal spacing between the third axis L3 and the fourth axis L4 is smaller than a minimal spacing between the first axis L1 and the second axis L2. The minimal spacing between the first axis L1 and the second axis L2 is smaller than 1.7 times the minimal spacing between the third axis L3 and the fourth axis L4.

The connecting device 40 includes a first gear 44, a second gear 45, a third gear 46, and a fourth gear 47. The first gear 44 is coupled to the first pivotal shaft 20. The first gear 44 and the first pivotal shaft 20 are jointly pivotable relative to the first supporting seat 41. The second gear 45 is coupled to the second pivotal shaft 30. The second gear 45 and the second pivotal shaft 30 are jointly pivotable relative to the first supporting seat 41. The third gear 46 is coupled to the first intermediate shaft 42. The third gear 46 and the first intermediate shaft 42 are jointly pivotable relative to the first supporting seat 41. The fourth gear 47 is coupled to the second intermediate shaft 43. The fourth gear 47 and the second intermediate shaft 43 are jointly pivotable relative to the first supporting seat 41. The third gear 46 meshes with the first gear 44. The fourth gear 47 meshes with the second gear 45. The third gear 46 meshes with the fourth gear 47.

The first intermediate shaft 42 includes a first section 421, a second section 422, a third section 423, a fourth section 424, and a fifth section 425. The third section 423 of the first intermediate shaft 42 includes a first coupling portion 4231, a second coupling portion 4232 opposite to the first coupling portion 4231, and a pivotal portion 4233 between the first coupling portion 4231 and the second coupling portion 4232. The second intermediate shaft 43 includes a first section 431, a second section 432, a third section 433, a fourth section 434, and a fifth section 435. The third section 433 of the second intermediate shaft 43 includes a first coupling portion 4331, a second coupling portion 4332 opposite to the first coupling portion 4331, and a pivotal portion 4333 between the first coupling portion 4331 and the second coupling portion 4332.

The connecting device 40 includes a second supporting seat 48 and a third supporting seat 49. The first supporting seat 41 is mounted around the pivotal portion 213 of the first section 21 of the first pivotal shaft 20, the pivotal portion 313 of the first section 31 of the second pivotal shaft 30, the first section 421 of the first intermediate shaft 42, and the first section 431 of the second intermediate shaft 43. The second supporting seat 48 is mounted around the pivotal portion 233 of the third section 23 of the first pivotal shaft 20, the pivotal portion 333 of the third section 33 of the second pivotal shaft 30, the pivotal portion 4233 of the third section 423 of the first intermediate shaft 42, and the pivotal portion 4333 of the third section 433 of the second intermediate shaft 43. The third supporting seat 49 is mounted around the pivotal portion 253 of the fifth section 25 of the first pivotal shaft 20, the pivotal portion 353 of the fifth section 35 of the second pivotal shaft 30, the fifth section 425 of the first intermediate shaft 42, and the fifth section 435 of the second intermediate shaft 43.

The first gear 44 includes a first section 441, a second section 442, a third section 443, and a fourth section 444. The second gear 45 includes a first section 451, a second section 452, a third section 453, and a fourth section 454. The third gear 46 includes a first section 461, a second section 462, a third section 463, and a fourth section 464. The fourth gear 47 includes a first section 471, a second section 472, a third section 473, and a fourth section 474.

An end of the first section 441 of the first gear 44 is mounted around the coupling portion 212 of the first section 21 of the first pivotal shaft 20. The other end of the first section 441 of the first gear 44 is mounted around the second section 22 of the first pivotal shaft 20. An end of the second section 442 of the first gear 44 is mounted around the second section 22 of the first pivotal shaft 20. The other end of the second section 442 of the first gear 44 is mounted around the first coupling portion 231 of the third section 23 of the first pivotal shaft 20. An end of the third section 443 of the first gear 44 is mounted around the second coupling portion 232 of the third section 23 of the first pivotal shaft 20. The other end of the third section 443 of the first gear 44 is mounted around the fourth section 24 of the first pivotal shaft 20. An end of the fourth section 444 of the first gear 44 is mounted around the fourth section 24 of the first pivotal shaft 20. The other end of the fourth section 444 of the first gear 44 is mounted around the coupling portion 252 of the fifth section 25 of the first pivotal shaft 20.

An end of the first section 451 of the second gear 45 is mounted around the coupling portion 312 of the first section 31 of the second pivotal shaft 30. The other end of the first section 451 of the second gear 45 is mounted around the second section 32 of the second pivotal shaft 30. An end of the second section 452 of the second gear 45 is mounted around the second section 32 of the second pivotal shaft 30. The other end of the second section 452 of the second gear 45 is mounted around the first coupling portion 331 of the third section 33 of the second pivotal shaft 30. An end of the third section 453 of the second gear 45 is mounted around the second coupling portion 332 of the third section 33 of the second pivotal shaft 30. The other end of the third section 453 of the second gear 45 is mounted around the fourth section 34 of the second pivotal shaft 30. An end of the fourth section 454 of the second gear 45 is mounted around the fourth section 34 of the second pivotal shaft 30. The other end of the fourth section 454 of the second gear 45 is mounted around the coupling portion 352 of the fifth section 35 of the second pivotal shaft 30.

An end of the first section 461 of the third gear 46 is mounted around the first section 421 of the first intermediate shaft 42. The other end of the first section 461 of the third gear 46 is mounted around the second section 422 of the first intermediate shaft 42. An end of the second section 462 of the third gear 46 is mounted around the second section 422 of the first intermediate shaft 42. The other end of the second section 462 of the third gear 46 is mounted around the first coupling portion 4231 of the third section 423 of the first intermediate shaft 42. An end of the third section 463 of the third gear 46 is mounted around the second coupling portion 4232 of the third section 423 of the first intermediate shaft 42. The other end of the third section 463 of the third gear 46 is mounted around the fourth section 424 of the first intermediate shaft 42. An end of the fourth section 464 of the third gear 46 is mounted around the fourth section 424 of the first intermediate shaft 42. The other end of the fourth section 464 of the third gear 46 is mounted around the fifth section 425 of the first intermediate shaft 42.

An end of the first section 471 of the fourth gear 47 is mounted around the first section 431 of the second intermediate shaft 43. The other end of the first section 471 of the fourth gear 47 is mounted around the second section 432 of the second intermediate shaft 43. An end of the second section 472 of the fourth gear 47 is mounted around the second section 432 of the second intermediate shaft 43. The other end of the second section 472 of the fourth gear 47 is mounted around the first coupling portion 4331 of the third section 433 of the second intermediate shaft 43. An end of the third section 473 of the fourth gear 47 is mounted around the second coupling portion 4332 of the third section 433 of the second intermediate shaft 43. The other end of the third section 473 of the fourth gear 47 is mounted around the fourth section 434 of the second intermediate shaft 43. An end of the fourth section 474 of the fourth gear 47 is mounted around the fourth section 434 of the second intermediate shaft 43. The other end of the fourth section 474 of the fourth gear 47 is mounted around the fifth section 435 of the second intermediate shaft 43.

The first component 51 includes a side having a first lug 511 and a second lug 512. The second component 52 includes a side having a third lug 521 and a fourth lug 522. The connecting portion 211 of the first section 21 of the first pivotal shaft 20 is connected to the first lug 511. The connecting portion 251 of the fifth section 25 of the first pivotal shaft 20 is connected to the second lug 512. The connecting portion 311 of the first section 31 of the second pivotal shaft 30 is connected to the third lug 521. The connecting portion 351 of the fifth section 35 of the second pivotal shaft 30 is connected to the fourth lug 522. The first gear 44, the second gear 45, the third gear 46, and the fourth gear 47 form a part of a contour of the electronic product 50.

Figure 4:
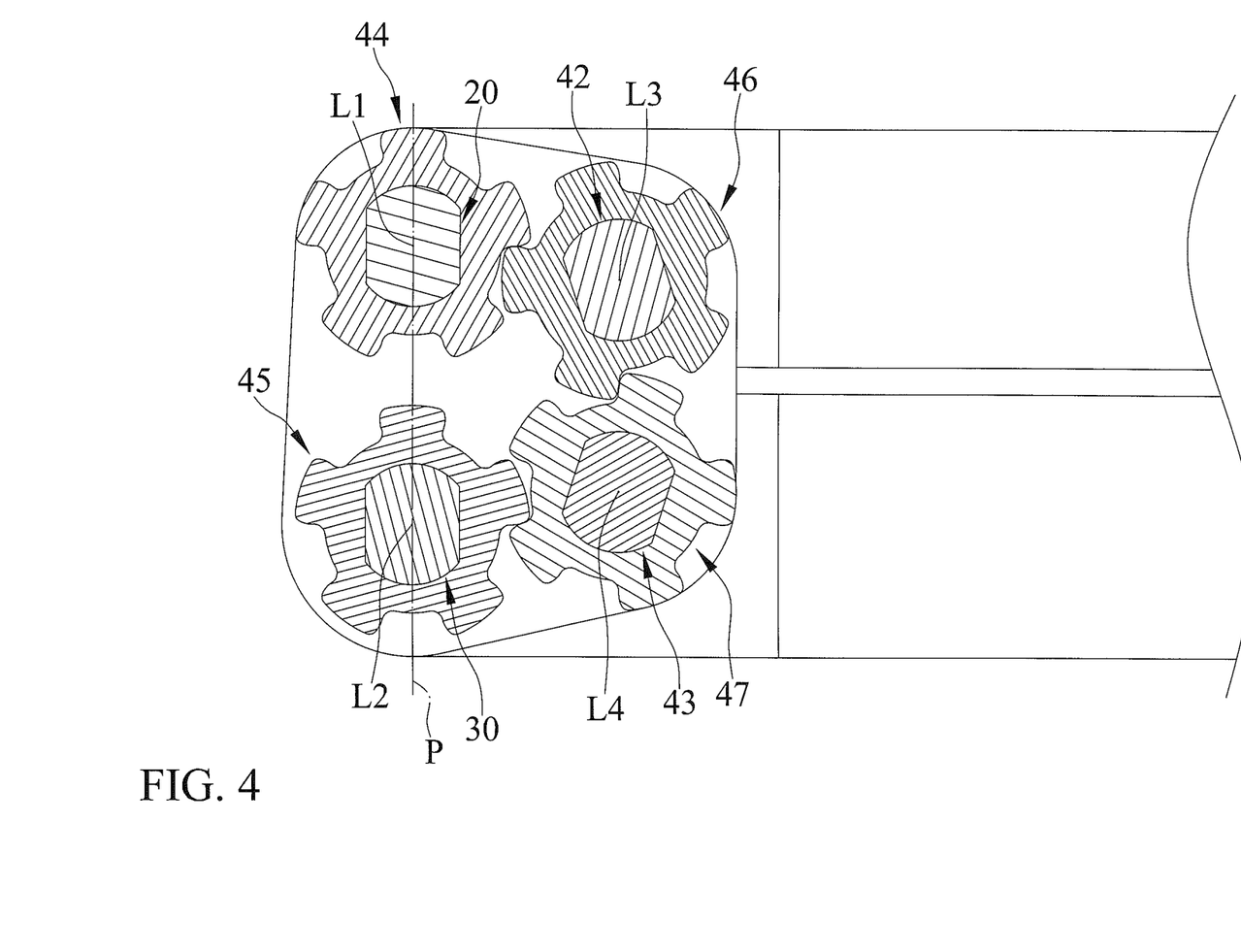
FIG. 4 is a cross sectional view of a portion of the electronic product in a closed state.
Figure 5:
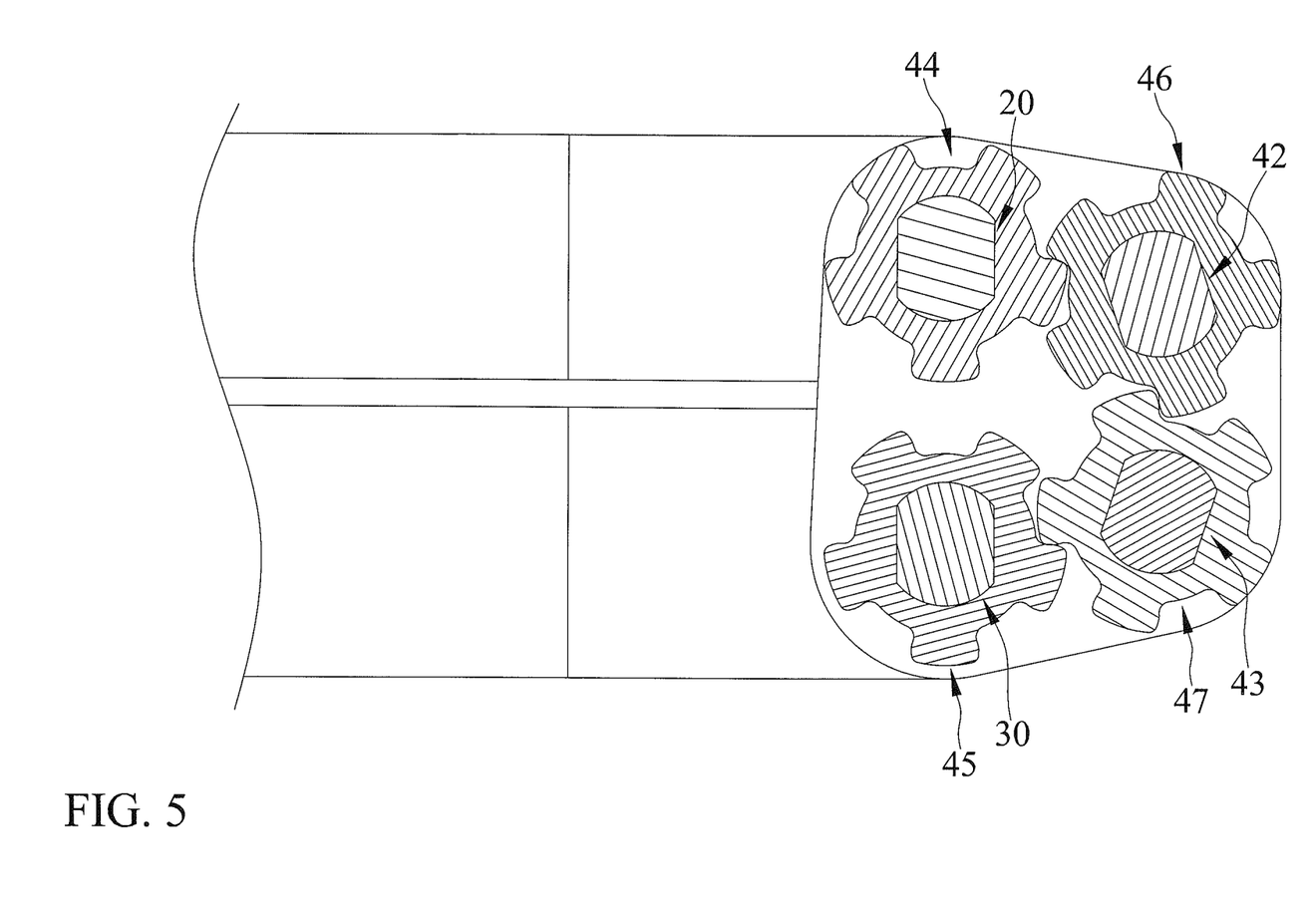
FIG. 5 is a cross sectional view of a portion of the electronic product in an open state.

By using the 360° pivotal device 10 in the electronic product 50, the first component 51 can pivot 360° relative to the second component 52. The electronic product 50 can be a notebook. After pivotal movement, the screen of the notebook can be located at the outer side. Due to the arrangement of the pivotal device 10, the spacing between the first pivotal shaft 20 and the second pivotal shaft 30 can be greatly reduced to reduce the thickness of the electronic product 50. In an ideal condition, the thickness of the electronic product 50 can be smaller than 10 mm. Furthermore, since the gears of the pivotal device 10 form a part of the contour of the electronic product 50, the gears of the pivotal device 10 can be made of various materials, such as plastic, metal, wood, stone, earth, etc. to provide the electronic product 50 with different appearances, enhancing the visual effect of the appearance of the electronic product 50.

Although specific embodiments have been illustrated and described, numerous modifications and variations are still possible without departing from the scope of the invention. The scope of the invention is limited by the accompanying claims.

The invention claimed is:

1. A 360° pivotal device for an electronic product, comprising:
a first pivotal shaft extending along a first axis;
a second pivotal shaft extending along a second pivotal axis;
a connecting device including a first supporting seat, a first intermediate shaft, and a second intermediate shaft, wherein the first intermediate shaft extends along a third axis, wherein the second intermediate shaft extends along a fourth axis, wherein the first pivotal shaft, the second pivotal shaft, the first intermediate shaft, and the second intermediate shaft are coupled to the first supporting seat, wherein the first axis, the second axis, the third axis, and the fourth axis are parallel to each other, wherein the connecting device includes a reference plane on which the first axis and the second axis are located, wherein the third axis and the fourth axis are on a same side of the reference plane, wherein the connecting device includes a first gear, a second gear, a third gear, and a fourth gear, wherein the first gear is coupled to the first pivotal shaft, wherein the first gear and the first pivotal shaft are jointly pivotable relative to the first supporting seat, wherein the second gear is coupled to the second pivotal shaft, wherein the second gear and the second pivotal shaft are jointly pivotable relative to the first supporting seat, wherein the third gear is coupled to the first intermediate shaft, wherein the third gear and the first intermediate shaft are jointly pivotable relative to the first supporting seat, wherein the fourth gear is coupled to the second intermediate shaft, wherein the fourth gear and the second intermediate shaft are jointly pivotable relative to the first supporting seat, wherein the third gear meshes with the first gear, wherein the fourth gear meshes with the second gear, wherein the third gear meshes with the fourth gear, wherein a minimal spacing between the third axis and the fourth axis is smaller than a minimal spacing between the first axis and the second axis, and wherein the minimal spacing between the first axis and the second axis is smaller than 1.7 times the minimal spacing between the third axis and the fourth axis.

2. The 360° pivotal device for an electronic product as claimed in claim 1, wherein the first pivotal shaft includes a first section, a second section, a third section, a fourth section, and a fifth section, wherein the first section of the first pivotal shaft includes a connecting portion, a coupling portion opposite to the connecting portion, and a pivotal portion between the connecting portion and the coupling portion, wherein the third section of the first pivotal shaft includes a first coupling portion, a second coupling portion opposite to the first coupling portion, and a pivotal portion between the first coupling portion and the second coupling portion, and wherein the fifth section of the first pivotal shaft includes a connecting portion, a coupling portion opposite to the connecting portion of the fifth section, and a pivotal portion between the connecting portion and the coupling portion of the fifth section.

3. The 360° pivotal device for an electronic product as claimed in claim 2, wherein the second pivotal shaft includes a first section, a second section, a third section, a fourth section, and a fifth section, wherein the first section of the second pivotal shaft includes a connecting portion, a coupling portion opposite to the connecting portion of the first section of the second pivotal shaft, and a pivotal portion between the connecting portion and the coupling portion of the first section of the second pivotal shaft, wherein the third section of the second pivotal shaft includes a first coupling portion, a second coupling portion opposite to the first coupling portion of the third section of the second pivotal shaft, and a pivotal portion between the first coupling portion and the second coupling portion of the third section of the second pivotal shaft, wherein the fifth section of the second pivotal shaft includes a connecting portion, a coupling portion opposite to the connecting portion of the fifth section of the second pivotal shaft, and a pivotal portion between the connecting portion and the coupling portion of the fifth section of the second pivotal shaft, wherein the first intermediate shaft includes a first section, a second section, a third section, a fourth section, and a fifth section, wherein the third section of the first intermediate shaft includes a first coupling portion, a second coupling portion opposite to the first coupling portion of the third section of the first intermediate shaft, and a pivotal portion between the first coupling portion and the second coupling portion of the third section of the first intermediate shaft, wherein the second intermediate shaft includes a first section, a second section, a third section, a fourth section, and a fifth section, wherein the third section of the second intermediate shaft includes a first coupling portion, a second coupling portion opposite to the first coupling portion of the third section of the second intermediate shaft, and a pivotal portion between the first coupling portion and the second coupling portion of the third section of the second intermediate shaft, wherein the connecting device includes a second supporting seat and a third supporting seat, wherein the first supporting seat is mounted around the pivotal portion of the first section of the first pivotal shaft, the pivotal portion of the first section of the second pivotal shaft, the first section of the first intermediate shaft, and the first section of the second intermediate shaft, wherein the second supporting seat is mounted around the pivotal portion of the third section of the first pivotal shaft, the pivotal portion of the third section of the second pivotal shaft, the pivotal portion of the third section of the first intermediate shaft, and the pivotal portion of the third section of the second intermediate shaft, wherein the third supporting seat is mounted around the pivotal portion of the fifth section of the first pivotal shaft, the pivotal portion of the fifth section of the second pivotal shaft, the fifth section of the first intermediate shaft, and the fifth section of the second intermediate shaft, wherein the first gear includes a first section, a second section, a third section, and a fourth section, wherein the second gear includes a first section, a second section, a third section, and a fourth section, wherein the third gear includes a first section, a second section, a third section, and a fourth section, wherein the fourth gear includes a first section, a second section, a third section, and a fourth section, wherein an end of the first section of the first gear is mounted around the coupling portion of the first section of the first pivotal shaft, wherein another end of the first section of the first gear is mounted around the second section of the first pivotal shaft, wherein an end of the second section of the first gear is mounted around the second section of the first pivotal shaft, wherein another end of the second section of the first gear is mounted around the first coupling portion of the third section of the first pivotal shaft, wherein an end of the third section of the first gear is mounted around the second coupling portion of the third section of the first pivotal shaft, wherein another end of the third section of the first gear is mounted around the fourth section of the first pivotal shaft, wherein an end of the fourth section of the first gear is mounted around the fourth section of the first pivotal shaft, wherein another end of the fourth section of the first gear is mounted around the coupling portion of the fifth section of the first pivotal shaft, wherein an end of the first section of the second gear is mounted around the coupling portion of the first section of the second pivotal shaft, wherein another end of the first section of the second gear is mounted around the second section of the second pivotal shaft, wherein an end of the second section of the second gear is mounted around the second section of the second pivotal shaft, wherein another end of the second section of the second gear is mounted around the first coupling portion of the third section of the second pivotal shaft, wherein an end of the third section of the second gear is mounted around the second coupling portion of the third section of the second pivotal shaft, wherein another end of the third section of the second gear is mounted around the fourth section of the second pivotal shaft, wherein an end of the fourth section of the second gear is mounted around the fourth section of the second pivotal shaft, wherein another end of the fourth section of the second gear is mounted around the coupling portion of the fifth section of the second pivotal shaft, wherein an end of the first section of the third gear is mounted around the first section of the first intermediate shaft, wherein another end of the first section of the third gear is mounted around the second section of the first intermediate shaft, wherein an end of the second section of the third gear is mounted around the second section of the first, intermediate shaft, wherein another end of the second section of the third gear is mounted around the first coupling portion of the third section of the first intermediate shaft, wherein an end of the third section of the third gear is mounted around the second coupling portion of the third section of the first intermediate shaft, wherein another end of the third section of the third gear is mounted around the fourth section of the first intermediate shaft, wherein an end of the fourth section of the third gear is mounted around the fourth section of the first intermediate shaft, wherein another end of the fourth section of the third gear is mounted around the fifth section of the first intermediate shaft, and wherein an end of the first section of the fourth gear is mounted around the first section of the second intermediate shaft, wherein another end of the first section of the fourth gear is mounted around the second section of the second intermediate shaft, wherein an end of the second section of the fourth gear is mounted around the second section of the second intermediate shaft, wherein another end of the second section of the fourth gear is mounted around the first coupling portion of the third section of the second intermediate shaft, wherein an end of the third section of the fourth gear is mounted around the second coupling portion of the third section of the second intermediate shaft, wherein another end of the third section of the fourth gear is mounted around the fourth section of the second intermediate shaft, wherein an end of the fourth section of the fourth gear is mounted around the fourth section of the second intermediate shaft, and wherein another end of the fourth section of the fourth gear is mounted around the fifth section of the second intermediate shaft.

4. An electronic product including the 360° pivotal device for an electronic product as claimed in claim 3, comprising:

a first component including a side having a first lug and a second lug; and a second component including a side having a third lug and a fourth lug;

wherein the connecting portion of the first section of the first pivotal shaft is connected to the first lug, wherein the connecting portion of the fifth section of the first pivotal shaft is connected to the second lug, wherein the connecting portion of the first section of the second pivotal shaft is connected to the third lug, wherein the connecting portion of the fifth section of the second pivotal shaft is connected to the fourth lug, and wherein the first gear, the second gear, the third gear, and the fourth gear form a part of a contour of the electronic product.

* * * * *